April 2, 1968     J. C. SORENSON     3,375,931
DISPOSABLE FLUID FILTER ELEMENT

Filed Sept. 27, 1965     2 Sheets-Sheet 1

INVENTOR.
JOHN C. SORENSON
BY
Merchant, Merchant & Gould
ATTORNEYS

April 2, 1968 J. C. SORENSON 3,375,931
DISPOSABLE FLUID FILTER ELEMENT
Filed Sept. 27, 1965
2 Sheets-Sheet 2

INVENTOR.
JOHN C. SORENSON
BY
Merchant, Merchant & Gould
ATTORNEYS

United States Patent Office 3,375,931
Patented Apr. 2, 1968

3,375,931
DISPOSABLE FLUID FILTER ELEMENT
John C. Sorenson, c/o Duluth Filter Co., 4230 W. 2nd St., Duluth, Minn. 55807
Filed Sept. 27, 1965, Ser. No. 490,336
3 Claims. (Cl. 210—350)

ABSTRACT OF THE DISCLOSURE

A disposable fluid filter element made up of a plurality of annular disks formed from refined cellulose and wood fibers, with said disks assembled in a cylindrical stack and maintained under substantial axial pressure by a centrally located tube flanged outwardly at either end thereof and end plates between said flanges and outermost disks. One of said end plates is mounted for axial movement toward said other plate to reduce radial channeling through said disk members. A method of forming disks so that the fibers therein lie approximately in the plane of the disk and a method of forming the disks into a fluid filter element.

---

This invention pertains to a disposable fluid filter element and assembly and more particularly to an improved completely disposable fluid filtering element which is assembled under great mechanical pressures.

Fluid filters are utilized in many fields and in particular as oil filters in large machinery. It is well known that quantities of lubricating oil are circulated through much heavy machinery, such as diesel engines and the like, to maintain this heavy machinery in good operating condition. This lubricating oil has a tendency to acquire small particles of dirt, metal, by-products of combustion, and the like, which causes a large amount of wear in the machinery if it is not removed.

In general, the filters constructed to remove the foreign particles from the lubricating oil consist of anywhere from one to a large plurality of filtering elements, each of which is a substantially cylindrical mass of filter media having a hollow cylindrical shaft therethrough. The lubricating oil is forced radially through the media to the central shaft, which has a plurality of radial openings therethrough in communication with the longitudinal opening. The clean lubricating oil is then drawn from the central shaft and utilized to lubricate the machinery.

In many prior art devices the filter media consists simply of some material, such as cotton fibers or the like, loosely packed in a cloth bag to form the cylindrical shape. The central shaft and some means at either end thereof which retain the media in position are generally permanent fixtures and the media is replaceable. This type of filter element is very undesirable because the oil under pressure quite readily channels holes through the media so that the oil flows freely therethrough and is not filtered.

In some prior art devices attempts to prevent channeling were made by providing a plate at one end of the filter media which gradually moved down the central shaft and compressed the media as the differential pressure across the media increased. This sliding plate is relatively successful, compared to the other prior art devices.

In the present invention the media is composed of a plurality of disk shaped members each of which consists of refined cellulose fibers, such as cotton or the like, and wood fibers intermixed. The formation of the refined cellulose and wood fibers into the members of the filter media is such that the longitudinal axes of the fibers in each member appear to lie predominantly in the plane of that member. It is believed the filtering of the media is due primarily to the adsorbence of the cotton rather than a screening process. Also, the density of the media is increased by the formation process since the refined cellulose and wood fibers are mixed in a water slurry after which they are drawn from the slurry into a blanket by a vacuum apparatus and the slurry water is compressed out of the blanket.

The disk shaped members are then stacked to form a cylindrical shape substantially longer than the central shaft and the members are compressed onto the shaft to greatly increase the density thereof. A moving plate or follower plate is placed at the free end of the shaft and means are fixed to the ends of the assembly to hold the media in the highly compressed state.

Thus, the present filter element is a completely disposable element, including the central shaft, the media, the movable plate, and the means holding the assembly together. Because the media is assembled on the shaft under great mechanical pressure, thereby, increasing the density in the range of from 20% to 50%, the present filter cleans the fluid better than any prior art with no channeling or the like. Also, because of the combination of the dense media and the moving plate, the life of the filter is greatly increased, and thus, the over-all filtration cost is reduced.

It is an object of the present invention to provide an improved fluid filter element.

It is a further object of the present invention to provide a filter element with improved filtering capabilities and a longer life.

It is a further object of the present invention to provide a filter element which is simple and inexpensive to construct and operate.

It is a further object of the present invention to provide a completely disposable filter element which reduces machine shutdown time.

These and other objects of this invention will become apparent to those skilled in the art upon consideration of the accompanying specification, claims and drawings.

Referring to the drawings wherein like characters indicate like parts throughout the figures.

Figures 1, 2, 7:
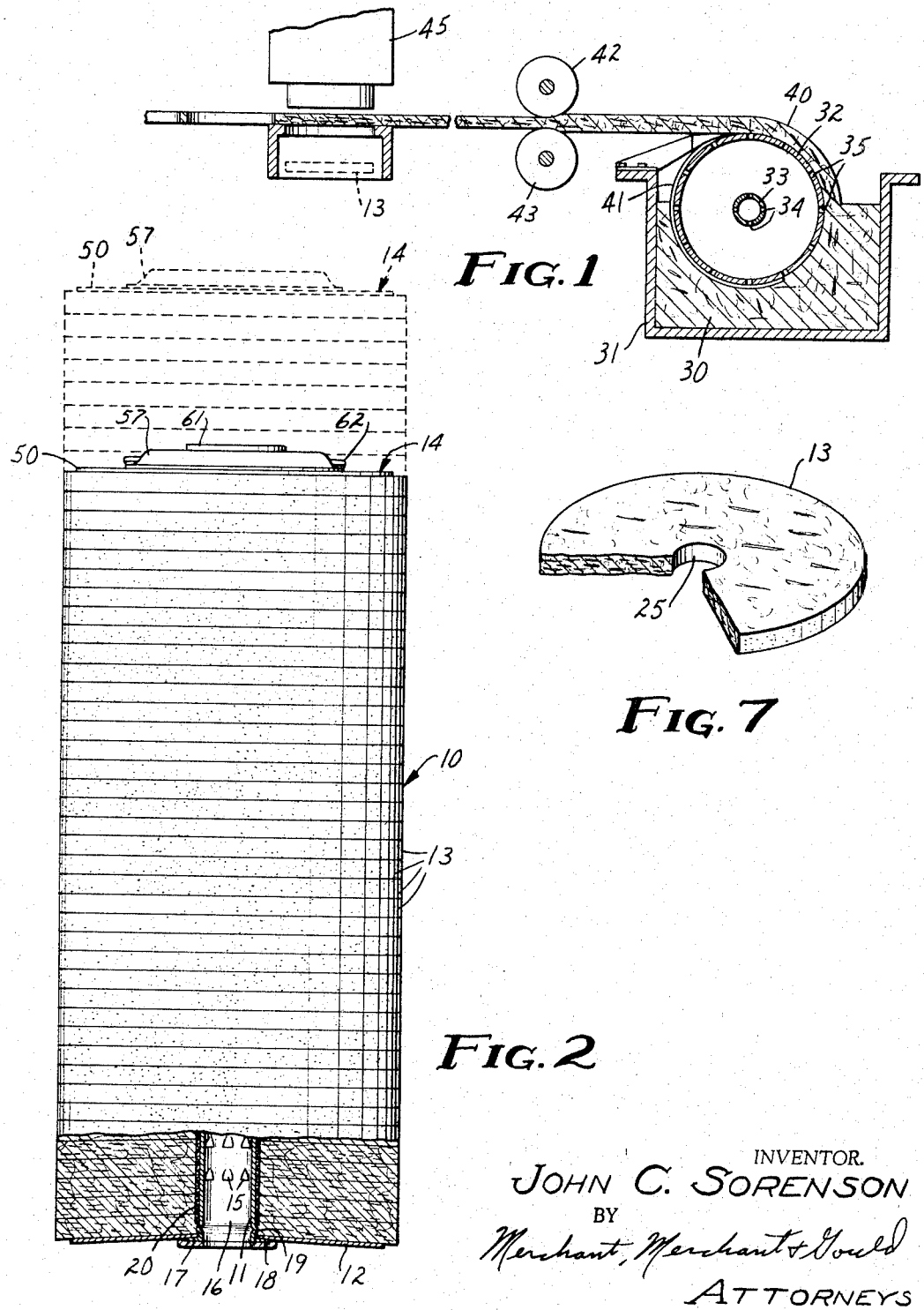
FIG. 1 is a somewhat schematic view of one type of a vacuum apparatus for removing fibers from a slurry.
FIG. 2 is a view in side elevation of the present disposable fluid filter, illustrating in dotted lines the size of the filter media before compression and assembly, parts thereof broken away and shown in section.
FIG. 7 is a view in perspective of a disk shaped member of the media illustrating the cross-sectional composition thereof.
Figure 4:
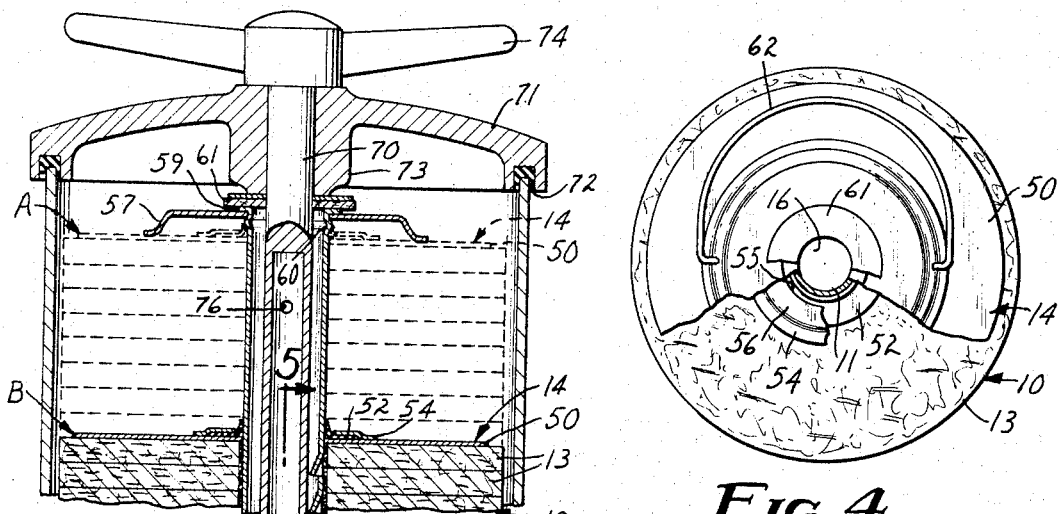
FIG. 4 is a view in top plan of the present filter element, parts thereof broken away and shown in section.

In the figures the numeral 10 generally designates the disposable fluid filter element which is composed of a central shaft 11, an end plate 12, the filter media made up of a plurality of disk shaped members 13, and the follower plate-fluid seal assembly generally designated 14. The central shaft 11 has a plurality of openings 15 therein, which in the present embodiment are constructed something like inwardly opening louvers but may simply be holes which are drilled, punched, etc. Each of the openings 15 is in communication with a central longitudinal opening 16 that extends through the entire length of the shaft 11. There are no openings 15 immediately adjacent the lower end of the shaft 11 and within a substantial distance from the upper end for reasons which will be explained presently.

The lower end of the shaft 11 is crimped or bent to form a radially outwardly extending flange 17. The flange 17 serves as a stop for the end plate 12 which butts against it in a substantially parallel relationship and tends to prevent the flow of fluid between the shaft 11 and the end plate 12. This flow of fluid is completely sealed by a washer 18 which is fixedly attached over the junction at the lower or outer surface. The washer 18 is constructed of a relatively non-porous material such as cork or the like which aids in forming a seal with the filter unit, as will be seen when referring to FIG. 3. The shaft 11 is dimpled at 19, or otherwise scored, immediately adjacent the inner surface of the end plate 12 to prevent longitudinal movement thereof relative to the shaft 11.

After the end plate 12 is secured to the end of the shaft 11 a fine mesh cylindrical shaped screen 20 is fitted coaxially over the shaft 11 to substantially cover the openings 15 and prevent any large particles of the filter media from passing therethrough. A plurality of the disk shaped members 13 are then fitted over the shaft 11 to form a cylinder substantially longer than the shaft 11, as illustrated in dotted lines in FIG. 2. Each of the members 13 has a substantially centrally located opening 25 therethrough which has a diameter slightly larger than the outer diameter of the shaft 11 and screen 20 so the members 13 can easily be stacked thereon.

The filter media (members 13) are composed of refined cellulose and wood fibers having a ratio in the range of approximately 50:50 to 70:30% by volume. The type of cellulose fibers used is a factor in determining the ultimate density of the filter media, density being defined as the pounds of material per cubic foot by volume. In general a relatively long staple cotton in the bleached or unbleached state is utilized as the refined cellulose fibers. It is believed that the relatively high adsorbing power of the cotton fibers aids the filtering process so that the fibers do not act merely as a screen to block the foreign particles. It should be understood that any cellulose fibers could be utilized in the present invention and cotton is simply set forth as an example with no intention of limiting this invention to that material. The wood fibers serve as a binder and are preferably a long fiber with low acid content such as that found in jack pine and redwood. It is desirable to maintain the acid content as low as possible since large quantities of acid can eventually mix with the oil and damage the machinery. The cotton and wood fibers are mixed in the desired ratio and suspended in a water slurry 30 illustrated in a tank 31 in FIG. 1.

In FIG. 1 a type of vacuum machine is illustrated schematically for purposes of explanation. As explained the fibers are suspended in a slurry 30 in tank 31. A hollow cylindrical roller 32 is rotatably mounted so that it is partially immersed in the slurry 30. The roller 32 has a conduit 33 centrally located therein which has a vacuum producing apparatus attached thereto, not shown, and about which the roller 32 rotates. The conduit 33 has a plurality of holes 34 therein which provide a partial vacuum within the roller 32. The roller 32 has a plurality of small holes 35 therein through which there is a tendency for the slurry 30 to pass. Although the holes 35 are shown relatively large, they are actually small enough to prevent the fibers from entering while allowing the slurry water to pass. In this fashion a continuous blanket 40 of refined cellulose and wood fibers is produced at the surface of the roller 32. When the cellulose fibers utilized are hollow fibers, such as cotton or the like, the vacuum tends to draw the fibers onto the surface of the roller 32 so that the longitudinal axes of the fibers appear to lie predominantly in the plane of the blanket 40. It is believed that this occurs because relatively little force is produced on the fibers along the longitudinal axes, since they are hollow and operate somewhat similar to the common drinking straw, and only the fibers with their axes oriented at an angle or perpendicular to the holes 35 will be drawn to the surface of the roller 32. This action tends to move some of the wood fibers into the plane of the blanket 40 also and, consequently, the longitudinal axes of all of the fibers lie predominantly in the plane of the blanket 40.

The roller 32 has a shield 41 partially encircling it and fixedly attached to the tank 31. The shield 41 is wedge shaped near the upper surface of the roller 32 so that the blanket 40 is tripped from the surface of the roller 32. As the blanket 40 is stripped from the roller 32, it travels between a pair of rollers 42 and 43 which compress the blanket 40 to remove any of the slurry water still therein and to increase the density of the blanket 40. The amount of compression at this time is also a factor in determining the final density of the filter media. Once the blanket 40 is compressed to the desired density, it may be cut into sections and stored, or dried, etc. The dried or semi-dried blanket 40 is then cut into disk shaped members 13 by a stamping machine 45 or the like. The drying stage is not illustrated in FIG. 1 since it may actually take place before or after the stamping stage depending upon a number of factors including the amount of moisture remaining in the blanket 40 after the rollers 42 and 43, the type of stamping machine 45, etc.

Figure 6:
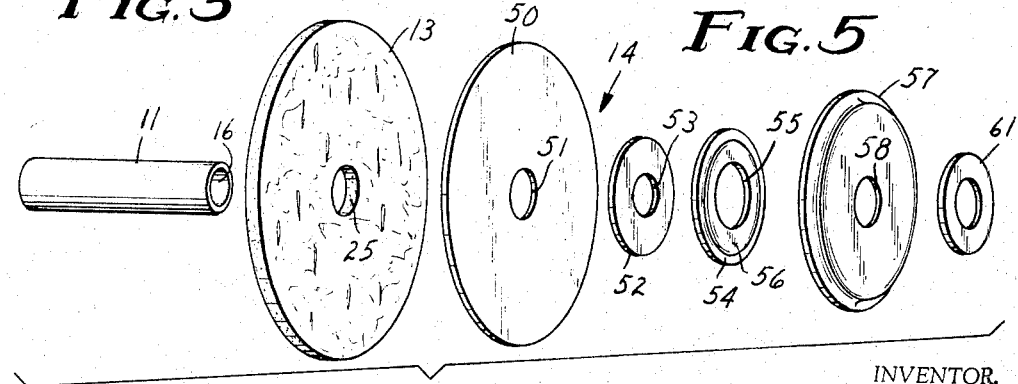
FIG. 6 is an exploded view of the shaft, follower plate and fluid seal.

Once the members 13 of the filter media are stacked on the shaft 11 the follower plate-fluid seal assembly 14 is placed at the top of the stack as illustrated in dotted lines in FIG. 2. The follower plate-fluid seal assembly 14 can be seen more clearly in FIG. 6. A disk shaped follower plate 50 has an outer diameter somewhat smaller than the outer diameter of the members 13 and a centrally located hole 51 therethrough which is slightly larger than the outside diameter of the shaft 11 for easy sliding movement therealong. A washer 52, which is constructed of a resilient material such as rubber or the like, has a centrally located hole 53 therethrough with a diameter somewhat smaller than the outer diameter of the shaft 11. The washer 52 is maintained substantially parallel and adjacent to the upper surface of the follower plate 50 by a second disk 54.

Figures 3, 5:
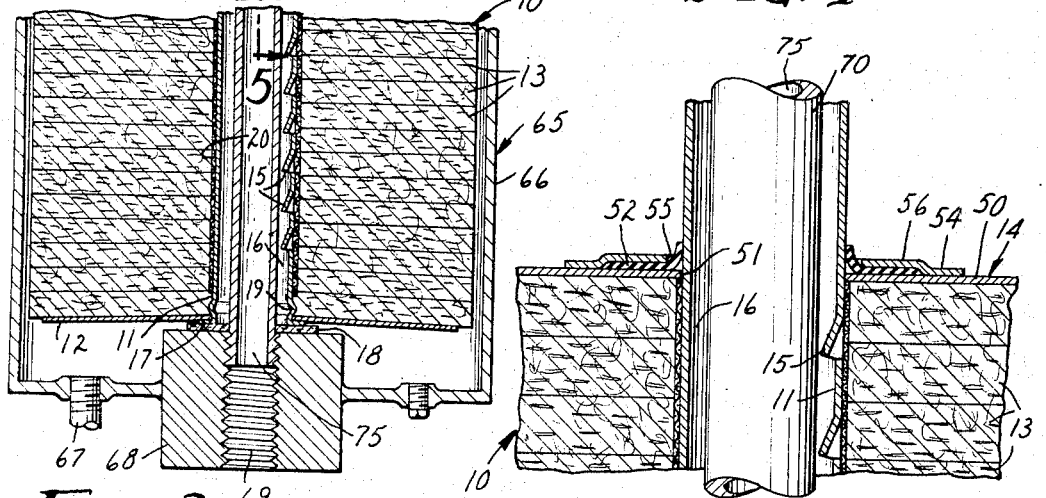
FIG. 3 is a sectional view of a filter containing the present filter element, illustrating in dotted lines the maximum compression of the filter media during use.
FIG. 5 is an enlarged sectional view as seen from the line 5—5 in FIG. 3.

Disk 54 has an outer diameter which is substantially larger than the outer diameter of the washer 52 and a centrally located hole therein 55 which has a diameter somewhat larger than the outer diameter of the shaft 11. As illustrated in FIG. 5 the disk 54 has a central raised portion 56 with a diameter substantially equal to the outer diameter of the washer 52. When the disk 54 is assembled over the washer 52 the outer portion of the disk 54 lies adjacent the surface of the follower plate 50 while the inner portion 56 of the disk 54 overlies the washer 52 and maintains the washer 52 in a substantially parallel abutting relationship with the follower plate 50. The disk 54 is attached to the upper surface of the follower plate 50 by some means such as spot welding or the like to maintain the entire assembly in fixed relationship. As can be seen in FIG. 5 when the follower plate 50, washer 52 and disk 54 are assembled on the shaft 11, the washer 52 forms a tight seal which prevents the flow of fluid between the shaft 11 and the follower plate 50.

After the follower plate-fluid seal assembly 14 is placed on top of the stack of members 13, a saucer shaped end plate 57 is placed over the assembly 14 so that the outer periphery thereof lies adjacent the follower plate 50 and the central portion is spaced longitudinally from the disk 54. The end plate 57 has a centrally located opening 58 therethrough with a diameter slightly larger than the outer diameter of the shaft 11. Also attached to the end plate 57 by some convenient means is an arcuate handle 62 which aids in the replacement and handling of the filter element 10. Once the various portions are assembled as described the entire assembly is compressed, as illustrated in full lines in FIG. 2, until the upper end of the shaft 11 protrudes through the hole 58 in the end plate 57. The upper end of the shaft 11 is then formed into a radially outwardly protruding flange 59 which prevents the assembly from expanding to its original size. The shaft 11 is then dimpled or otherwise scored at 60, between the end plate 57 and the disk 54 to maintain the end plate 57 substantially immovable with respect to the shaft 11. A washer 61, which is similar to washer 18, is then fixedly attached over the junction of the shaft 11 and the end plate 57 in a manner similar to the attachment of the washer 18. In the present embodiment the amount of force required to compress the filter media (member 13) to the desired thickness is in the range of approximately 1,250 lbs. to 1,950 lbs. The compression of the filter media results in an increase of density in the range of approximately 20% to 50% of its original density.

It should be understood that the described procedure for assembling the filter element 10 could be reversed and the operation would be equally efficient. That is, the entire assembly could be assembled in a press up-side down and the end plate 57 and follower plate-fluid seal assembly 14 could be assembled on shaft 11 first, then the members 13 could be assembled and finally the end plate 12. The dimpling or scoring of shaft 11 at 19 and 60 can be accomplished after the entire filter element 10 is assembled.

A filter 65, which is utilized for explanatory purposes, is illustrated in FIG. 3 with the present filter element 10 operatively assembled therein. The filter 65 consists of a generally cylindrical body 66 with an inner diameter somewhat larger than the outer diameter of the filter element 10. The lower end of the body 66 has a conduit 67 fixedly attached therethrough for introducing the fluid to be filtered therein. A block 68, which operates as the base of the filter 65, is approximately centrally located in the lower end of the body 66 and forms an integral part thereof. The block 68 has a central hole 69 therein which is threaded to receive a shaft 70. A cap 71 having circular groove 72 around the outer periphery thereof with a diameter substantially equal to the body 66, fits over the upper end of the body 66, with the upper edge of the body 66 in the groove 72, to seal the upper end thereof. The central portion 73 of the cap 71 extends downwardly a substantial distance so that when the cap 71 is in place on the body 66, the distance between the upper edge of the block 68 and the lower edge of the extension 73 is slightly shorter than the length of the filter element 10. The shaft 70 extends through the cap 71 and has a handle 74 at the upper end thereof for assembly purposes.

In assembly the filter element is placed in the body 66 of the filter 65 and the cap 71 is placed in its sealing position. In this position the washer 18 rests on the block 68 and the extension 73 of cap 71 rests on the washer 61 to form fluid-tight seals between the filter element 10 and the filter 65. A second washer may be placed over the washer 61 to insure a better seal if so desired. The shaft 70 is inserted through the opening in the cap 71 and extended downwardly through the shaft 11 of the filter element 10 until it threadedly engages the opening 69 in the block 68. The handle 74 is then turned until the entire assembly is tightly sealed. The shaft 70 has a longitudinal opening 75 extending from the lower end thereof to approximately the height of the upper end of the filter element 10. The opening 75 in the shaft 70 is in communication with the opening 16 in the shaft 11 by a radial opening 76 in the shaft 70.

The fluid which enters the filter body 66 through the conduit 67 passes through the filter element 10 from the outer periphery of the members 13 to the inner periphery where it enters the shaft 11 through the openings 15. All of the fluid passing through the filter element 10 has approximately the same distance to travel since the follower plate 50 and the end plate 12 prevent fluid from flowing into the filter element 10 from the ends thereof. The fluid in the shaft 11 enters the opening 75 in the shaft 70 through the radial opening 76 and passes out of the filter 65 through the opening 69 in the block 68.

The fluid flowing through the filter element 10 creates a difference in pressure across the filter media (members 13) because of the restricted flow therethrough. This differential pressure, which occurs between the outer surface of the filter media and the inner surface thereof, or shaft 11, is present not only on the entire outer periphery of the filter media but also on the end plate 12 and the follower plate 50. As the filter media 10 collects foreign particles this differential pressure increases and could eventually cause the fluid to form paths or channels through the media. However, as the differential pressure across the media increases, the pressure on the follower plate 50 also increases causing the follower plate 50 to slide downwardly along the shaft 11. This movement of the follower plate 50 compresses the media, further, and increases the density, thereby, preventing channeling. The movement of the follower plate 50 is illustrated in FIG. 3. The upper portion of the media is shown in dotted lines to illustrate that the follower plate 50 can move from its original position, indicated by the letter A, to a final position, indicated by the letter B. While FIG. 3 illustrates the maximum distance the follower plate 50 can move, position B, it should be understood that the follower plate 50 might only move a fraction of an inch. The distance follower plate 50 actually moves under various operating conditions varies anywhere between fractions of an inch to the maximum depending upon the operating conditions. It should be noted that no holes 15 are provided in the shaft 11 between position A and position B, since such holes would provide a path for unfiltered fluid when the follower plate 50 moved longitudinally. Also, the screen 20 extends only from the bottom of the shaft 11 to approximately the position B so it does not hamper the longitudinal movement of the follower plate 50.

Thus, a filter element 10 has been described which has a greatly increased efficiency and which can filter and retain much smaller particles than any prior art devices because it is much denser than any prior art device. Also, there is no channeling in the present filter element 10, in spite of the high density, because of the follower plate which prevents any channeling and greatly increases the life of the filter element 10. In addition to the above advantages, the present filter element is completely disposable and can be quickly exchanged with a new element, which greatly reduces the labor and shut-down time of the machinery.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. A disposable fluid filter element comprising:
  (a) a cylindrical shaped tube having a longitudinal opening therethrough and a plurality of radial openings in communication therewith;
  (b) filter media including a plurality of disk shaped members each having a substantially centrally located opening therethrough and consisting essentially of refined cellulose and wood fibers arranged so their longitudinal axes lie substantially in the plane of the disk shaped member with the ratio of the cellulose to the wood fibers being in the range of approximately 50:50 and 70:30% by volume, said disk shaped members being assembled coaxially on said tube in parallel planes substantially perpendicular to the longitudinal axis of said tube and under mechanical pressure directed parallel to the longitudinal axis of said tube sufficient to increase the density of said filter media in the range of ap- proximately 20% to 50%, said filter media being adapted to have a fluid flow from the outer periphery to said radial openings in said tube with a differential fluid pressure thereacross;

(c) means associated with one end of said tube for preventing movement of said filter media beyond said one end and for substantially preventing fluid flow from the end of said filter media adjacent said one end of said tube to said radial openings in said tube;

(d) a disk shaped follower plate having a substantially centrally located opening therethrough slideably mounted on said tube in abutment with said filter media and parallel to the planes of the members thereof so that said substantially centrally located opening of said follower plate is coaxial with said tube for longitudinal movement therealong and having a fluid seal attached thereto for preventing the flow of fluid between said follower plate and said tube, said follower plate moving against said filter media toward said one end of said tube as the differential fluid pressure across said media increases due to foreign particles and media resistance therein; and (e) means associated with said tube adjacent said other end thereof for maintaining said follower plate slideably engaged with said tube and for maintaining said filter media under substantial mechanical pressure.

2. A disposable fluid filter element substantially as set forth in claim 1 wherein the wood fiber is selected from the group consisting of jack pine and redwood having relatively long fibers and low acid content.

3. A disposable fluid filter element substantially as set forth in claim 1 wherein the fluid seal consists of a resilient disk shaped member having an approximately centrally located opening with a diameter somewhat smaller than the outer diameter of the tube, said resilient member being affixed coaxially to the outer surface of the follower plate by a second plate which has an approximately centrally located opening therethrough with a diameter slightly larger than the outside diameter of said shaft and is fixedly secured to said follower plate in a coaxial, overlying relationship to said resilient member.

References Cited

UNITED STATES PATENTS

| | | | |
|---|---|---|---|
| 2,454,033 | 11/1948 | Briggs | 210—488 X |
| 2,742,155 | 4/1956 | Sather | 210—350 X |
| 3,092,577 | 6/1963 | Sather | 210—488 X |

REUBEN FRIEDMAN, *Primary Examiner.*

SAMIH N. ZAHARNA, *Examiner.*

J. DE CESARE, *Assistant Examiner.*